(12) United States Patent
Bischoff et al.

(10) Patent No.: US 9,830,811 B2
(45) Date of Patent: Nov. 28, 2017

(54) ACCESSIBLE PEDESTRIAN SIGNAL STATION

(71) Applicants: Doug Bischoff, St. Cloud, MN (US); Blake D. Redfield, Sauk Rapids, MN (US)

(72) Inventors: Doug Bischoff, St. Cloud, MN (US); Blake D. Redfield, Sauk Rapids, MN (US)

(73) Assignee: Tip Indications LLC, St. Cloud, MN (US)

( * ) Notice: Subject to any disclaimer, the term of this patent is extended or adjusted under 35 U.S.C. 154(b) by 603 days.

(21) Appl. No.: 14/266,376

(22) Filed: Apr. 30, 2014

(65) Prior Publication Data

US 2014/0340244 A1 Nov. 20, 2014

Related U.S. Application Data

(60) Provisional application No. 61/817,722, filed on Apr. 30, 2013.

(51) Int. Cl.
| | | |
|---|---|---|
| *F16M 11/00* | (2006.01) | |
| *G08G 1/005* | (2006.01) | |
| *E01F 9/685* | (2016.01) | |
| *E01F 9/615* | (2016.01) | |
| *E01F 9/635* | (2016.01) | |
| *B23P 6/00* | (2006.01) | |

(52) U.S. Cl.
CPC ............ *G08G 1/005* (2013.01); *E01F 9/617* (2016.02); *E01F 9/635* (2016.02); *E01F 9/685* (2016.02); *B23P 6/00* (2013.01); *Y10T 29/4973* (2015.01)

(58) Field of Classification Search
CPC . E01F 9/635; E01F 9/617; E01F 9/685; E01F 9/681; G08G 1/005; Y10T 29/4973; B23P 6/00
USPC ................... 52/98–99, 848–849; 256/65.14; 40/607.1, 2; 340/944
See application file for complete search history.

(56) References Cited

U.S. PATENT DOCUMENTS

| | | | | |
|---|---|---|---|---|
| 3,262,240 | A | | 7/1966 | Schuman et al. |
| 3,381,427 | A | | 5/1968 | Watson |
| 3,491,971 | A | * | 1/1970 | Fisher ...................... F16L 3/13 24/339 |
| 3,837,752 | A | * | 9/1974 | Shewchuk .............. F21V 21/06 248/158 |
| 3,967,906 | A | * | 7/1976 | Strizki .................... E01F 9/635 256/13.1 |
| 5,039,366 | A | * | 8/1991 | Strattman ............... F16L 3/221 156/264 |
| 5,103,223 | A | | 4/1992 | Humphrey |
| 5,482,234 | A | * | 1/1996 | Lyon ....................... F16L 3/12 248/74.1 |
| 5,855,443 | A | * | 1/1999 | Faller ...................... E01F 9/635 248/548 |

(Continued)

OTHER PUBLICATIONS

Unknown, "Pedestrian Push Button Station and Multipule Loop Series Hookup," State Proj. No. 7104-19 (T.H 25) Feb. 8, 2011, 1 page.

*Primary Examiner* — Christopher E Garft
(74) *Attorney, Agent, or Firm* — Pauly, DeVries Smith & Deffner LLC

(57) ABSTRACT

A readily replaceable accessible pedestrian signal station is described including a bottom base plate and a sacrificial base plate.

19 Claims, 14 Drawing Sheets

(56) References Cited

U.S. PATENT DOCUMENTS

| | | | |
|---|---|---|---|
| 6,056,471 A * | 5/2000 | Dinitz | E01F 9/681 403/2 |
| 6,234,277 B1 * | 5/2001 | Kaczmarek | B66B 7/06 174/42 |
| 6,340,936 B1 | 1/2002 | Mcgaffey et al. | |
| 6,422,783 B1 | 7/2002 | Jordan | |
| 6,457,895 B1 | 10/2002 | Salman | |
| 6,732,983 B1 * | 5/2004 | Blake | H02G 3/32 248/74.2 |
| 7,077,598 B1 * | 7/2006 | Leonhardt | E01F 9/623 116/63 R |
| 7,162,790 B1 * | 1/2007 | Daniels | F16L 3/04 174/40 CC |
| 7,219,873 B2 * | 5/2007 | Harwood | E04H 12/2261 181/171 |
| 7,537,412 B2 | 5/2009 | Lewis | |
| 7,721,476 B2 | 5/2010 | Tumlinson et al. | |
| 2003/0205006 A1 * | 11/2003 | Conner | E01F 9/635 52/98 |
| 2004/0251392 A1 * | 12/2004 | Franks, Jr. | H02G 3/30 248/497 |
| 2010/0148989 A1 | 6/2010 | Hawkins et al. | |
| 2010/0214129 A1 | 8/2010 | Brualla Marti et al. | |
| 2011/0140923 A1 * | 6/2011 | Keller | G09F 27/00 340/944 |
| 2011/0148660 A1 | 6/2011 | Tate et al. | |

* cited by examiner

ACCESSIBLE PEDESTRIAN SIGNAL STATION

This application claims the benefit of U.S. Provisional Patent Application No. 61/817,722, filed Apr. 30, 2013, the disclosure of which is incorporated by reference herein in its entirety.

FIELD OF THE INVENTION

The present invention relates to an accessible pedestrian signal station. More specifically, the present invention relates to an accessible pedestrian signal station that is easily replaced.

BACKGROUND OF THE INVENTION

According to the National Highway Traffic Safety Administration, thousands of pedestrians are killed every year in pedestrian vehicle accidents. One way to decrease the number of accidents between pedestrians and vehicles is to provide designated crosswalks for pedestrians to safely cross a street. Frequently, crosswalks are provided with traffic signals to control the flow of traffic on the road which the crosswalk crosses. In order for a pedestrian to signal the traffic signal that they are waiting to cross the street, an accessible pedestrian signal can be provided. The accessible pedestrian signal can have a button that is pressed by a pedestrian that sends a signal to the traffic signal to stop traffic for a period of time to allow the pedestrian to safely cross the street. It can also have features that make it easy to find and use by visually-impaired or otherwise physically-challenged pedestrians, such as a speaker to provide a locating tone and verbal instructions, reflective materials and large symbols and print. Often these features are standardized and governed by state or local regulations. While audio output is extremely useful to visually-impaired pedestrians, it also can attract negative attention such as from vandals or people who lean against or pull on the signal structure, even if they do not intend to damage it.

In some instances the button can be located on a stand-alone pedestal, such as to be located conveniently for the pedestrian. A standalone pedestal has a risk of being damaged, such as being struck by a car, snowplow or other vehicle or being vandalized. If a pedestal is damaged it can become defective and not able to send a signal to a traffic signal that a pedestrian desires to have traffic stopped in order to safely use a crosswalk, thereby creating a hazardous situation if the pedestrian attempts to cross the street. The process to replace or fix a pedestal can be expensive and time consuming. Weather conditions can also affect the ability to replace or fix a pedestal.

Accordingly, there is a need for an accessible pedestrian signal that is more readily replaceable.

SUMMARY OF THE INVENTION

In an embodiment, an accessible pedestrian signal system to assist persons crossing a signal-controlled intersection is provided. The accessible pedestrian signal system can include a post configured to support a pedestrian interface and pedestrian activation device, the post having a bottom end and a top end; a bottom base plate configured for long-term operative attachment to a surface material, the bottom base plate defining an aperture to accommodate wire connections there through; a sacrificial base plate configured for attaching to the bottom base plate and to the bottom end of the post, the sacrificial base plate defining an aperture to accommodate wire connections there through, the sacrificial base plate separated from the bottom base plate by a gap, and a plurality of connectors passing through the gap between the bottom base plate and the sacrificial base plate and connecting the bottom base plate to the sacrificial base plate; wherein the sacrificial base plate is configured to structurally fail more readily than the bottom base plate in response to a force being applied to the post.

In an embodiment, the gap between the two plates is at least 0.125 inches and not more than 1.75 inch.

In an embodiment, the bottom base plate is at least 0.25 inches thick and no more than 1.5 inches thick and the sacrificial base plate is at least 0.1 inches and no more than 0.75 inches thick.

In an embodiment, the bottom base plate comprises the same material as the sacrificial base plate and the bottom base plate is thicker than the sacrificial base plate.

In an embodiment, the surface material comprises one or more of the following materials: concrete, asphalt, and cement.

In an embodiment, the bottom base plate is configured for attaching to the surface material using two or more anchor bolts.

In an embodiment, the sacrificial base plate is configured to be coupled to the bottom base plate with one or more connectors.

In an embodiment, the accessible pedestrian signal system can further include a locking mechanism configured to engage a portion of one or more of the connectors.

In an embodiment, the locking mechanism comprises a locking washer.

In an embodiment, one or more of the connectors defines a notch.

In an embodiment, the sacrificial base plate is configured to attach to the bottom end of the post using connectors.

In an embodiment, the accessible pedestrian signal system can further include a reinforcing band surrounding at least a portion of the bottom base plate.

In an embodiment, the bottom base plate and the sacrificial base plate are substantially circular and have substantially similar diameters, wherein the diameters are at least 5 inches and not more than 12 inches.

In an embodiment, the post comprises a speaker configured for audio communication with pedestrians.

In an embodiment, the post comprises a rounded dome at the top end.

In an embodiment, the pedestrian activation device is configured to send a signal to a traffic control system indicating that a pedestrian is waiting to cross a street.

In an embodiment, the sacrificial base plate comprises perforations.

In an embodiment, the sacrificial base plate comprises a break line.

In an embodiment, a method of replacing an accessible pedestrian signal system to assist persons crossing a signal-controlled intersection is provided. The method can include removing a plurality of connectors that couple a first sacrificial base plate to a post; removing the first sacrificial base plate; coupling a second sacrificial base plate to the post with a plurality of connectors; and coupling the second sacrificial base plate to a bottom base plate with one or more bolts and leaving a gap between the second sacrificial base plate and the bottom base plate; wherein the first sacrificial base plate is substantially similar to the second sacrificial base plate; wherein the first sacrificial base plate and the second sacrificial base plate are each individually thinner than the bottom base plate and wherein the first and second sacrificial base plates are designed to structurally fail more readily than the bottom base plate in response to a force being applied to the post.

In an embodiment, an accessible pedestrian signal system designed to be coupled to a bottom base plate including a post configured to support a pedestrian interface and pedestrian activation device, the post having a bottom end and a top end; and a sacrificial base plate configured to be coupled to the bottom end of the post with one or more connectors, the sacrificial base plate defining a conduit aperture to accommodate wire connections there through, and a plurality of connector apertures configured to accommodate a connector passing there through is provided.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE FIGURES

The invention may be more completely understood in connection with the following drawings, in which.

Figure 1:
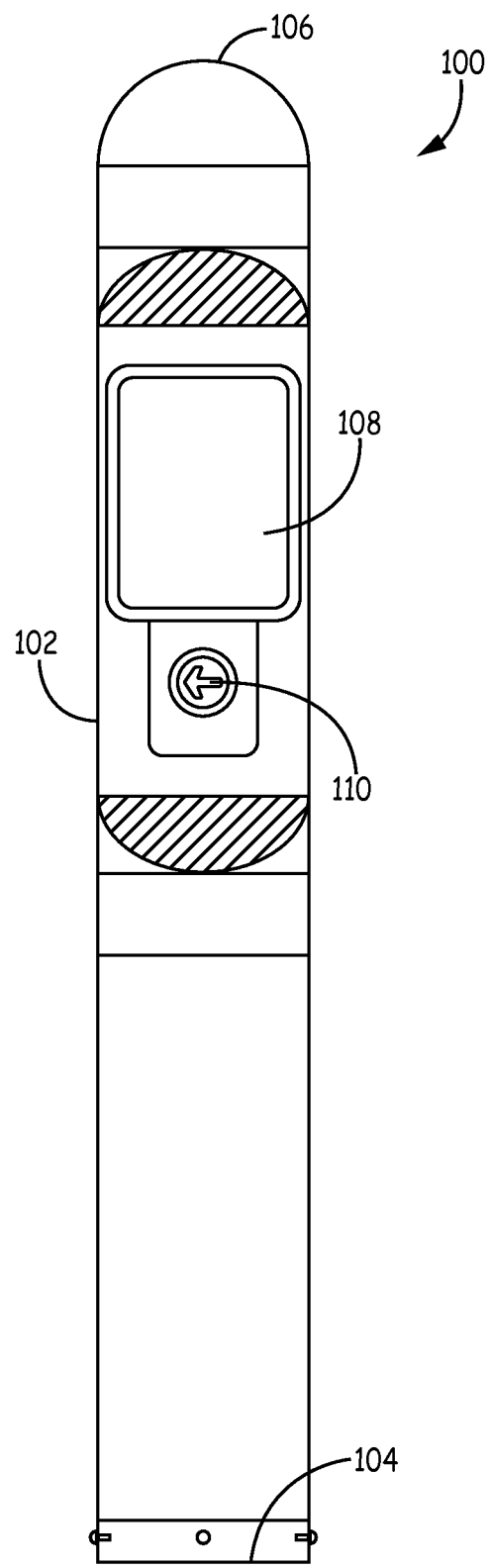
FIG. 1 is a front view of an accessible pedestrian signal station, according to an embodiment.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

An accessible pedestrian signal (APS) station is described herein which is more easily and inexpensively repaired if damaged. APS stations are frequently targeted by vandals and may also be hit by vehicles or snowplows. Some prior APS stations have included a post with a threaded base that screws into a threaded receptacle that is embedded in the concrete. If a vehicle hits the post or the APS station is toppled by a vandal, frequently both the post and the threaded receptacle are damaged. Replacing the threaded receptacle that is embedded in the concrete involves a significant effort and may not be possible in the winter months in some locations.

In one embodiment of an improved APS station, a base plate structure is provided that is easily repairable. A post of the APS holds the pedestrian interface and activation device, and the post attaches to the base plate structure. The base plate structure includes a bottom base plate that is attached to a surface material, such as concrete or asphalt. The bottom base plate is designed for long-term attachment to the surface material. In one example, the bottom base plate is attached to the surface material using long anchor bolts that are embedded in the surface material. The base plate structure also includes a sacrificial base plate designed to be positioned between and attach to both the bottom base plate and the bottom end of the post. The sacrificial base plate is designed to structurally fail more readily than the bottom base plate in response to a force being applied to the post. As a result, if a vehicle hits the post, or another type of significant force is applied to the post, the sacrificial base plate will fail before the bottom base plate fails. Even though the post will no longer be held upright by the sacrificial base plate, the bottom base plate will be undamaged. To repair the APS station, a new post and new sacrificial base plate is installed and connected to the bottom base plate. It is not necessary to remove or replace any components that are embedded in the concrete in order to repair the base station.

Figure 2:
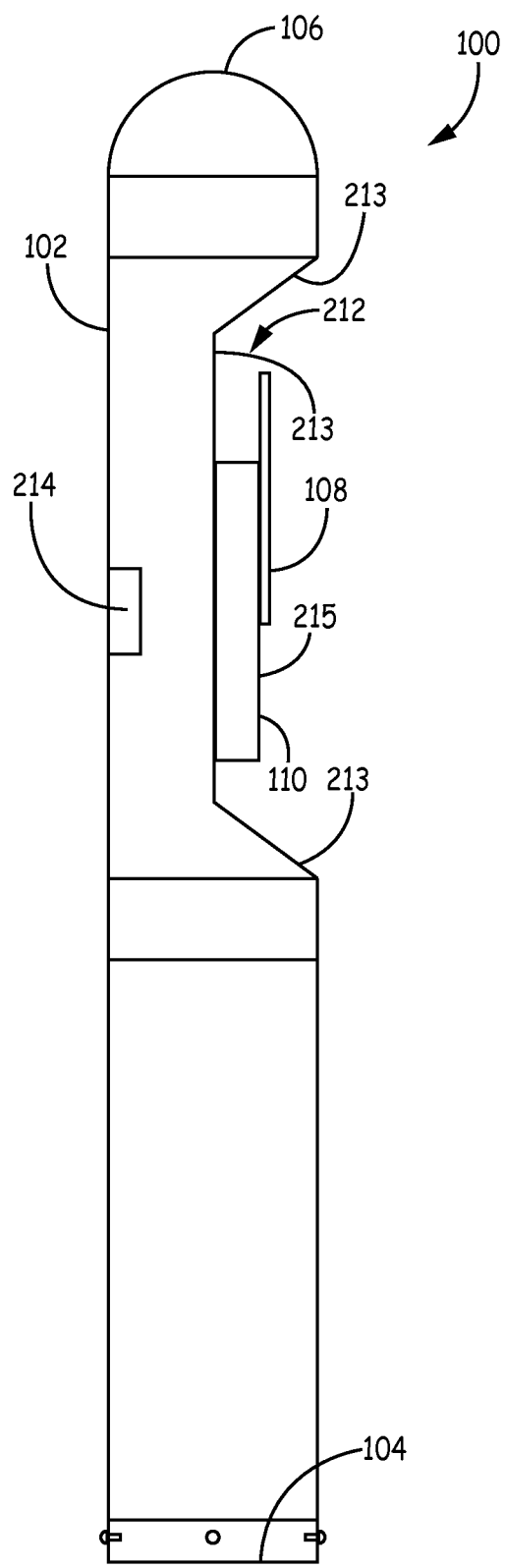
FIG. 2 is a side view of the accessible pedestrian signal station of FIG. 1.

FIG. 1 shows a front view of an APS station 100, according to an embodiment. FIG. 2 shows a side view of the APS station 100. An APS station 100 can include a post 102. The post 102 can be generally cylindrical. A cross section of the post 102 can be circular. In an embodiment, the diameter can be 5 inches or more. In one embodiment, the diameter can be 12 inches or less. In an embodiment, the post is hollow. The post 102 can include a bottom end 104, such as the end closer to the ground when the post is installed, and a top end 106, such as the end further away from the ground when the post 102 is installed. The post 102 can include aluminum alloy, such as one or more of the following alloys according to the naming scheme established by the International Alloy Designation System: 6000 series aluminum, 3000 series aluminum, and 5000 series aluminum. The post can include a crushable aluminum. The top end 106 can be rounded, such as a dome shape or half of a sphere. The top end 106 can be rounded. Smooth and rounded features are present throughout the design of the post. A rounded top end 106 and other smooth features, lacking sharp corners, welds and seams, limits the amount of rain, snow, or ice that accumulates on the top surface and other parts of the post 102. These rounded features also make the post safer for pedestrian interaction. In an embodiment, the post 102 can include 6000 series aluminum, and the top end 106 can include 3000 series aluminum or 5000 series aluminum. The top end 106 can include aluminum alloy, such as one or more of the following: 6000 series aluminum, 3000 series aluminum, and 5000 series aluminum.

The post 102 can include a pedestrian interface 108. The pedestrian interface 108 can include a plurality of words and pictures, such as those shown in FIG. 3. The pedestrian interface 108 can include a pedestrian activation device 110 that can be configured to send a signal to a traffic control system such that a user can activate the pedestrian activation device 110 to signal that a pedestrian is waiting to cross a street. The pedestrian activation device 110 can include a button or a switch.

In an embodiment, the pedestrian interface 108 includes a speaker configured to provide audio communication with a user, such as to signal the user it is safe to cross the street or to signal the location of the APS station 100.

As seen in FIG. 2, the post 102 can include a recessed portion 212, such as a portion of the outside surface that is setback from the rest of the outside surface. The pedestrian interface 108 and pedestrian activation device 110 can be located on the recessed portion 212, such as to provide at least some protection from elements, such as weather or vandalism. The recessed portion 212 can include one or more planar surfaces. In an embodiment, the recessed portion 212 includes three planar surfaces, as shown in FIG. 2. In an embodiment, the surfaces of the APS station 200, such as the planar surfaces of the recessed portion 212, are sloped or vertical, so that water or precipitation is not able to accumulate on them. The activation device 110 is recessed within a structure 215 which supports the activation device 110 and the pedestrian interface 108 so that it is protected.

The recessed portion 212 can be configured to house a pedestrian interface 108, such as a pedestrian interface 108 that meets the guidelines of the Americans with Disabilities Act ("ADA") or the guidelines of the Manual on Uniform Traffic Control Devices ("MUTCD").

Further the post 102 can include an access panel 214. In an embodiment the access panel 214 can be located on the opposite side of the post 102 from the recessed portion 212. The access panel 214 can be located at a height corresponding to the pedestrian activation device 110 to facilitate installation and maintenance of the pedestrian activation device 110.

The access panel 214 can be opened to provide access to the interior of the post 102. The access panel 214 can be hinged to the post 102. The access panel 214 can be bolted to the post 102, so that maintenance or installation personnel would take the access panel 214 off of the post 102 when access to the interior of the post 102 is desired.

Figure 3:
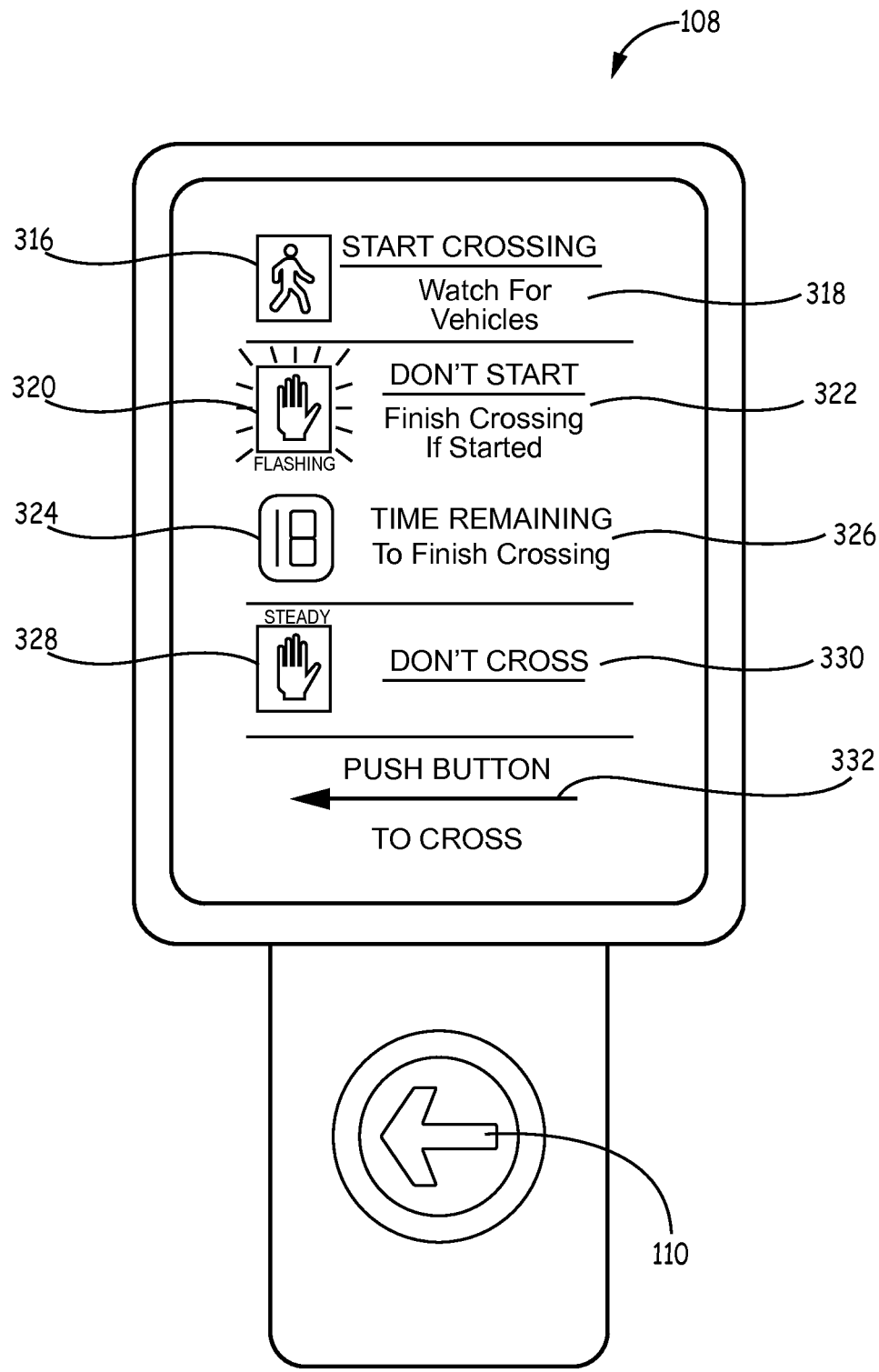
FIG. 3 is a view of a pedestrian interface, according to an embodiment.

FIG. 3 shows a pedestrian interface 108, according to an embodiment. The pedestrian interface can include a plurality of pictures and words providing pedestrians information about the meaning of pictures that may appear as pedestrian signals on a nearby traffic signal. The pedestrian interface 108 may also include text and arrows indicating the existence and location of a pedestrian activation device and the direction of the crosswalk that the pedestrian activation device controls. The pedestrian interface 108 can be configured to meet the guidelines of the ADA and the MUTCD.

The pedestrian interface 108 can include a "START CROSSING" picture 316 of what the traffic signal will display during the "START CROSSING" interval, and words 318 describing what the pedestrian should do, namely, start crossing and watch for vehicles. The pedestrian interface 108 can include a "DON'T START" picture 320 of what the traffic signal will display during the "DON'T START" interval, and words 322 describing what the pedestrian should do, namely, don't start crossing the street but finish crossing the street if already started. The pedestrian interface 108 can include a "TIME REMAINING" picture 324 of what the traffic signal will display when counting down the time remaining to cross and words 326 describing this function. The pedestrian interface 108 can include a "DON'T CROSS" picture 328 of what the traffic signal will display during the "DON'T CROSS" interval, and words 330 describing what the pedestrian should do, namely, don't cross the street. The pedestrian interface 108 can include an arrow 332 showing the direction of the crosswalk. The pedestrian interface 108 can also include instructions to the pedestrian to push or otherwise activate the pedestrian activation device 110, which can be a button 110 or a sensor, in order to request a signal to cross the street. The pedestrian interface 108 may include one or more of the elements described for a pedestrian interface 108.

Figure 4:
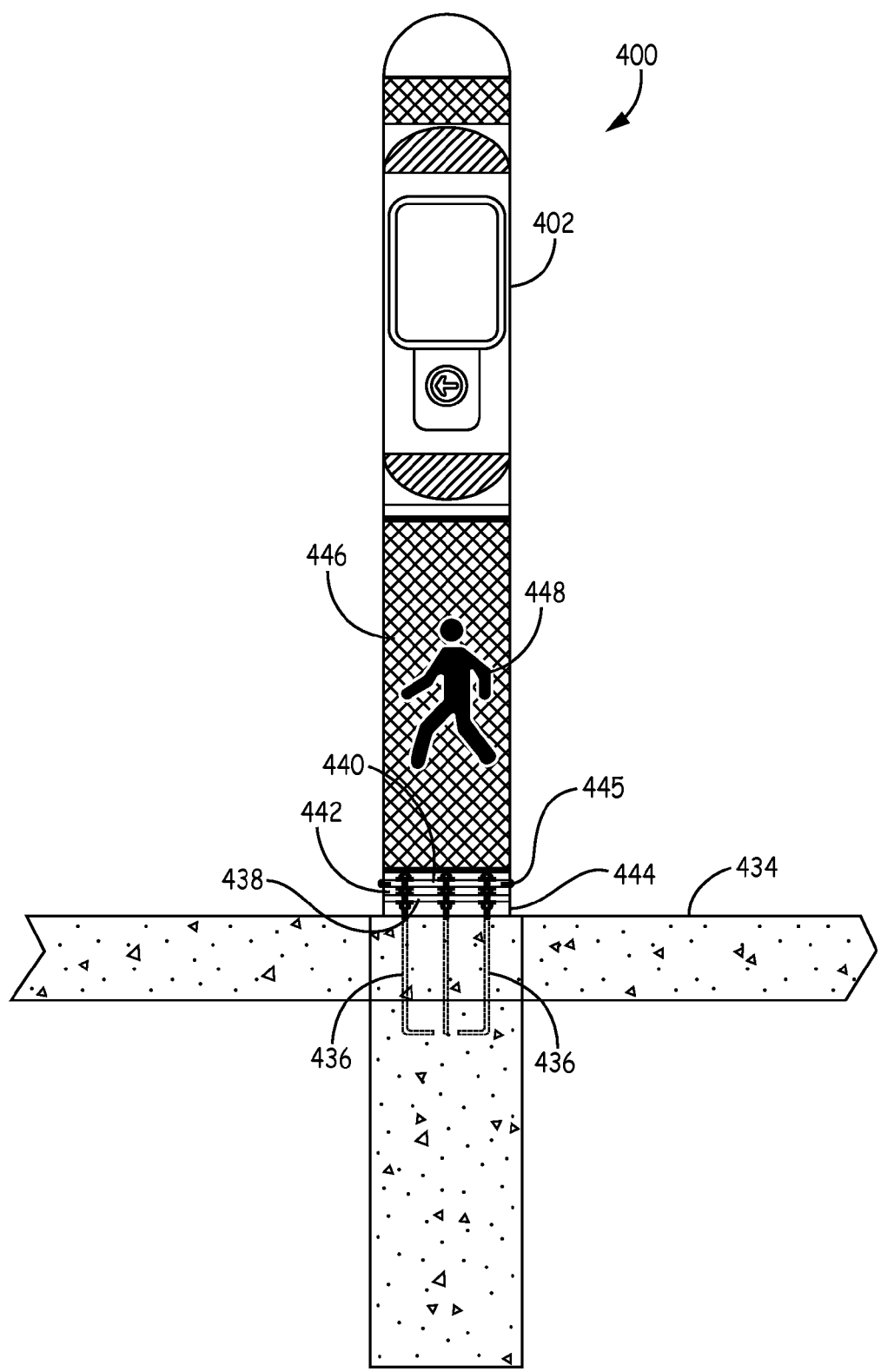
FIG. 4 is a view of an accessible pedestrian signal station and portions of an environment it can be used in, according to an embodiment.

FIG. 4 shows an alternative APS station 400 and portions of an environment it can be used in, according to an embodiment. The APS station 400 can be anchored or coupled to a surface material 434 for some type of pathway, where the surface material provides a durable surface for travel by people. A pathway can describe one or more of the following (including the area within the close vicinity of them): a sidewalk, a median, a parking lot, a road, a street, an alley, a bike lane, a curb, and a curb cut. A surface material can include one or more of the following: concrete, asphalt, and cement.

An APS station 400 can be attached to a surface material, such as with one or more anchors 436, a bottom base plate 438, and a sacrificial base plate 440. The bottom base plate 438 can be configured for long-term operative attachment to a surface material, such that the bottom base plate 438 can have a life cycle of more than one sacrificial base plate 440. In an embodiment, the bottom base plate 438 can be permanent, such that the bottom base plate 438 can have a life cycle of more than one sacrificial base plate 440. The sacrificial base plate 440 can be sacrificial, such as to be configured to fail under less force than the bottom base plate 438. The sacrificial base plate 440 can be configured to structurally fail, such as by failing to support the post in an upright configuration, more readily than the bottom base plate 438 in response to a force being applied to the post, such as a car striking the post. A sacrificial base plate 440 can be considered to have failed when it can no longer support the post 402 in an upright position or it cannot support the post 402 in an upright position when a minimal force is applied to the post 402. A post 402 can be in an upright position when the post 402 is substantially perpendicular to the ground or surface the post 402 is installed on.

In an embodiment, the sacrificial base plate 438 is designed to fail when struck by a vehicle traveling at 5 mph or faster.

As shown in the embodiment of FIG. 4, multiple anchors 436 can be used to hold the APS station to the surface material. In the embodiment of FIG. 4, a first portion of each anchor 436 is disposed in the surface material 434. A second portion of each anchor 436 is not disposed in the surface material 434 but is instead extending from the surface material. This second portion of each anchor 436 can be either coupled to the bottom base plate 438 and the sacrificial base plate 440, or be coupled to the bottom base plate 438.

In an embodiment, two or more anchors 436 are used to couple the bottom base plate 438 to the surface material 434. In certain embodiments, three anchors, four anchors, or other numbers of anchors 436 are used. In an embodiment, the anchors can be a substantially straight. In an embodiment, the anchors can be L-shaped, such as shown in FIG. 4. In an embodiment, the length of the anchor can be 4 inches or more. In one embodiment, the length of the anchor can be 16 inches or less.

The sacrificial base plate 440 can be configured to be coupled or otherwise attached to the bottom end 104 of the post 402 with connectors, such as bolts, screws, or an adhesive. The sacrificial base plate 440 can be configured to be coupled or otherwise attached to the bottom base plate, such as with connectors.

The bottom base plate 438 can be parallel to the sacrificial base plate 440. In some installation locations, the surface material will have a sloped top surface. The bottom base plate 438 may also be sloped upon installation or it can be leveled to have a horizontal orientation by positioning the nuts supporting the bottom base plate 438 along the anchors 436, so that the nuts are horizontally aligned. The position of the nuts along the connectors can be used to orientate the sacrificial base plate 440 horizontally, even if the bottom base plate 438 is sloped. The bottom base plate 438 and the sacrificial base plate 440 can define a gap 442. A gap 442 can be included between the bottom base plate 438 and sacrificial base plate 440, such that the mechanical properties of one of the base plates is not transferred to the other base plate, such as when a force is applied to the post 402. In an example, the gap between the two plates is at least 0.125 inches and not more than 1.75 inch. In an example, the gap between the two plates is 1.5 inches.

A reinforcing band 444 can be coupled to one or more of the bottom base plate 438, the sacrificial base plate 440, and the post 402, such as with connector 445. In one example, the reinforcing band 444 is coupled to the post 402 and the sacrificial base plate 440, but not coupled to the bottom base plate 438. The reinforcing band 444 can provide protection to the connectors, which may allow for easier removal in the event of the APS station being struck by a vehicle because the connectors are less likely to be damaged. The reinforcing band may provide additional strength, such as to help the APS station 400 stay upright when a force is applied. The reinforcing band 444 can surround the outside surface of the base plates, such as to at least partially enclose the gap 442, within the bottom base plate 438, the sacrificial base plate 440 and the reinforcing band 444.

A difference compared to APS station 100 is that APS station 400 of FIG. 4 can include a reflective material 446 on the post 402, such as on the outer surface. The reflective material 446 can be a bright color, such as yellow or green, to aid pedestrians in locating the APS station 400. The reflective material 446 can be a sheet of material that is applied to the outer surface of the post 402. The reflective material 446 can cover only a portion of the post 402. There can be one or more figures 448 on the post 402, such as to inform pedestrians of the nature of the APS station 400. The figures 448 can be walking figures, such as shown in FIG. 4. In an embodiment, there can be a plurality of figures 448 around the post 402, such that at least a portion of a figure 448 is visible from any side of the APS station 400.

Figure 5A:
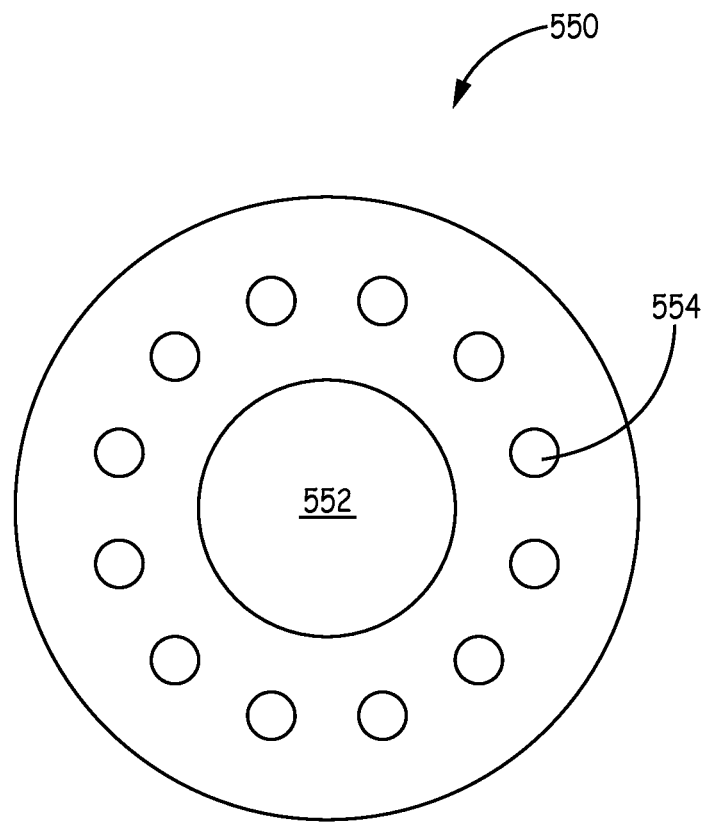
FIG. 5A is a top view of a base plate, according to an embodiment.
Figure 5B:
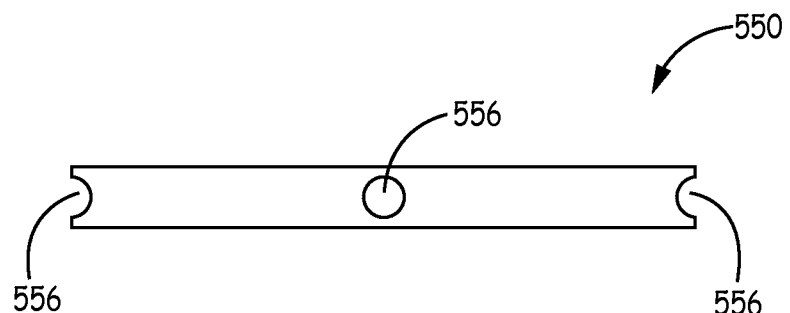
FIG. 5B is a side view of the base plate of FIG. 5A.

FIG. 5A shows a top view of a base plate 550, according to an embodiment. FIG. 5B shows a side view of a base plate 550. The base plate 550 shown in FIG. 5A and FIG. 5B can be representative of either a bottom base plate 438 or a sacrificial base plate 440.

The base plate 550 can define an aperture 552, such as to accommodate wire connections there through. The post 402 can include wires that provide power to the APS and allow the APS station 400 to communicate with one or more traffic signals. The wires can extend through the aperture 552, such as from the pedestrian activation device 110 to a traffic signal.

The base plate 550 can define two or more connection apertures 554, such as to accommodate connectors there through. The connection apertures 554 can allow a connector or an anchor to pass through the base plate 550, such as to sandwich the base plate 550 between two nuts on an anchor or bolt. In some embodiments, the number of connection apertures 554 is the same as the number of connectors or anchors 436. In some embodiments, some of the connection apertures of the base plate 550 are used to secure the post 402 to the base plate 550 via post connectors. In an embodiment, the base plate 550 can define twelve connection apertures 554, such that the base plate is rotatable in 30 degree increments. In an embodiment, the base plate 550 can define twenty four connection apertures 554, such that the base plate is rotatable in 15 degree increments. It is understood that other numbers of connection apertures 550 are possible.

In an embodiment of a sacrificial base plate 440, one or more of the apertures 554 can allow a connector to pass through to couple the sacrificial base plate 440 to the bottom base plate 438 and one or more of the apertures 554 can allow a connector to pass through to couple the sacrificial base plate 440 to the post 402. In an embodiment, half of the apertures 554 are allocated for coupling the sacrificial base plate 440 with the bottom base plate 438, and half of the apertures 554 are allocated for coupling the sacrificial base plate 440 with the post 402. Other ratios of apertures 554 allocated for coupling the sacrificial base plate 440 with the post 402 and coupling with the bottom base plate 438 are possible, such as 2:1, 3:1, and 4:3. In an embodiment, more apertures 554 can be allocated for coupling the sacrificial base plate 440 with the post 402. In an alternative embodiment, more apertures 554 can be allocated for coupling the sacrificial base plate 440 with the bottom base plate.

In an embodiment of a bottom base plate 438, one or more of the apertures 554 can allow a connector to pass through to couple the bottom base plate 438 to the sacrificial base plate 440 and one or more of the apertures 554 can allow an anchor to pass through to couple the bottom base plate 438 with the surface material 434. In an embodiment, four of the apertures 554 are allocated for coupling the bottom base plate 438 with the sacrificial base plate 440, and four of the apertures 554 are allocated for coupling the bottom base plate 438 with surface material 434. The presence of additional apertures allows for flexibility in which apertures 554 are used to best align with the anchors 436 extending from the surface material 434. Other ratios of apertures 554 allocated for coupling the bottom base plate 438 with the surface material 434 and for coupling with the sacrificial base plate 440 are possible, such as 2:1, 3:1, and 4:3. In an embodiment, more apertures 554 can be allocated for coupling the bottom base plate 438 with the surface material 434. In an alternative embodiment, more apertures 554 can be allocated for coupling the bottom base plate 438 with the sacrificial base plate.

In an embodiment, the sacrificial base plate 440 can have a different number of apertures 554 than the bottom base plate 438, such as if more apertures 554 are used to couple the sacrificial base plate 440 with the post 402 than are used to couple the bottom base plate 438 with the surface material 434. Alternatively, more apertures 554 can be used to couple the bottom base plate 438 to the surface material 434 than are used to couple the sacrificial base plate 440 to the post 402.

Figure 7:
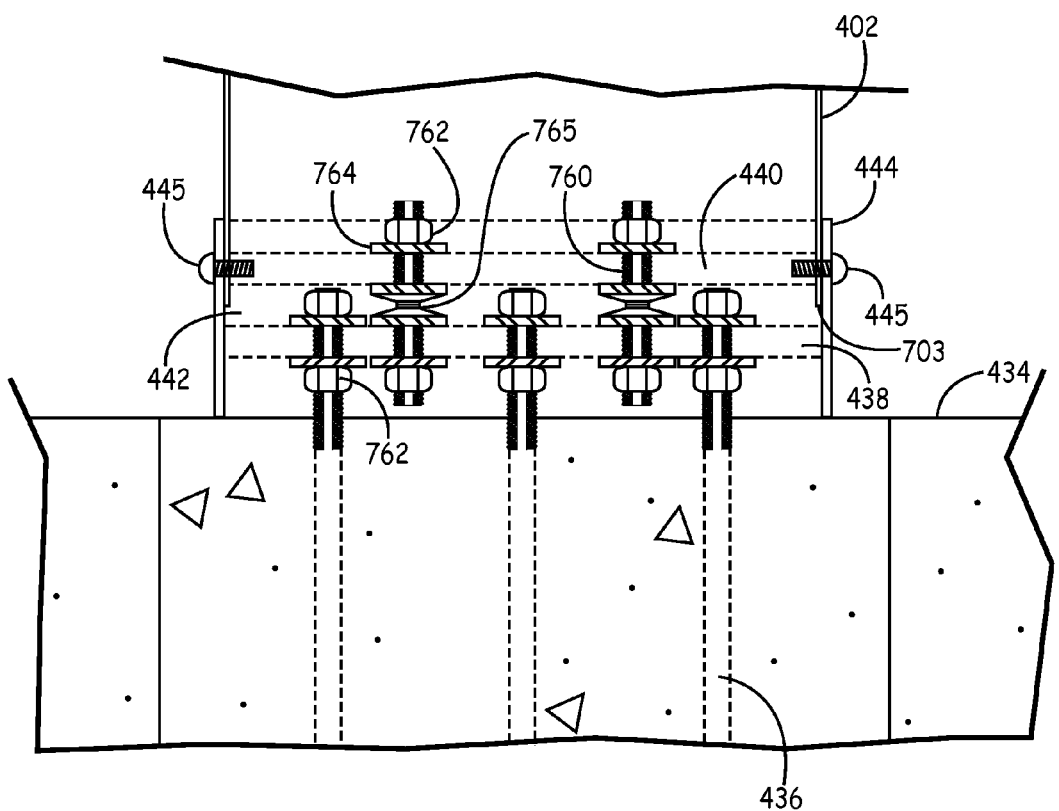
FIG. 7 is a view of a portion of an accessible pedestrian signal station and portions of an environment it can be used in, according to an embodiment.
Figure 8:
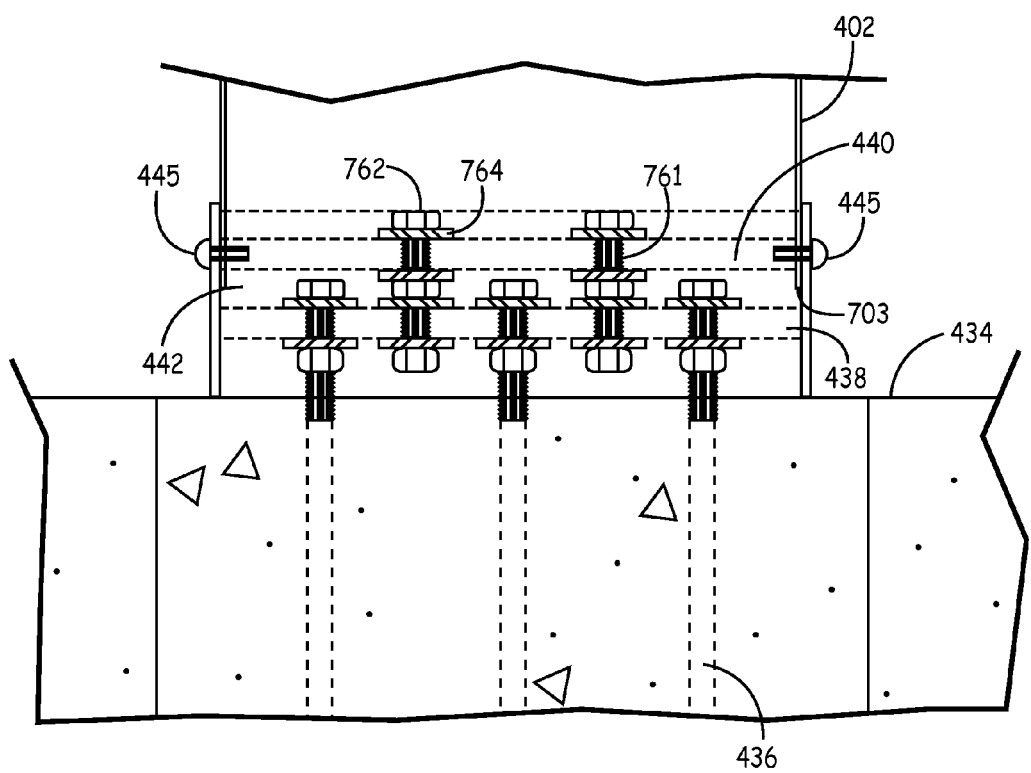
FIG. 8 is a view of a portion of an accessible pedestrian signal station and portions of an environment it can be used in, according to an embodiment.

In one embodiment, the connection apertures 554 of the sacrificial base plate are not used for connecting with the post 402. The base plate 550 can include a top surface, a bottom surface, and a side surface. The base plate 550 can define reinforcement band connection apertures 556 as shown in FIG. 5B extending inward from the side surface, such as to provide a location for a bolt or other connector to couple the post 402 and the reinforcement band 444 to a base plate 550. As shown in FIGS. 7 and 8, in an embodiment, the post 402 can be coupled with base plate 550 via reinforcement band connector 445 through reinforcement band connection apertures 556, such as a vandal resistant stainless steel fastener. The reinforcement band connector 445 can extend at least partially into the reinforcement band connection aperture 556. In an embodiment, a 5/16 inch vandal resistant stainless steel fastener couples the post 402 with the sacrificial base plate 440. In an embodiment, a vandal resistant fastener has a diameter of 0.125 inches or more. In an embodiment, a vandal resistant fastener has a diameter of 0.75 inches or less.

Referring back to FIGS. 5A and 5B, the base plate 550 can include aluminum. In an embodiment, the base plate 550 can include aluminum alloy, such as one or more of the following: 6000 series aluminum, 3000 series aluminum, and 5000 series aluminum. In an embodiment, the base plate 550 can be casted. In an embodiment, the base plate 550 can be cut from a plate or sheet of material. In an embodiment, the thickness of the bottom base plate can be 0.25 inches or more. In one embodiment, the thickness of the bottom base plate can be 1.5 inches or less. In an embodiment, the thickness of the sacrificial base plate can be 0.1 inches or more. In an embodiment, the thickness of the sacrificial base plate can be 0.75 inches or less. The sacrificial base plate can be thinner than the bottom base plate, such as to allow the sacrificial base plate to structurally fail before the bottom base plate.

The connection apertures 554 in the base plate 550 can be circular, oval, or other shapes. The base plate 550 can be substantially circular. In an embodiment, the diameter of the base plate 550 can be 5 inches or more. In an embodiment, the diameter of the base plate 550 can be 12 inches or less. The diameter of the post 402 can be substantially similar to the diameter of the base plate 550. The bottom base plate 438 and the sacrificial base plate 440 can have substantially similar diameters. In an embodiment, the bottom base plate 438 can have a smaller diameter than the sacrificial base plate 440. For example, in an embodiment the bottom base plate 438 can have a diameter of about 9.5 inches and the sacrificial base plate can have a diameter of about 9.75 inches.

Figure 6:
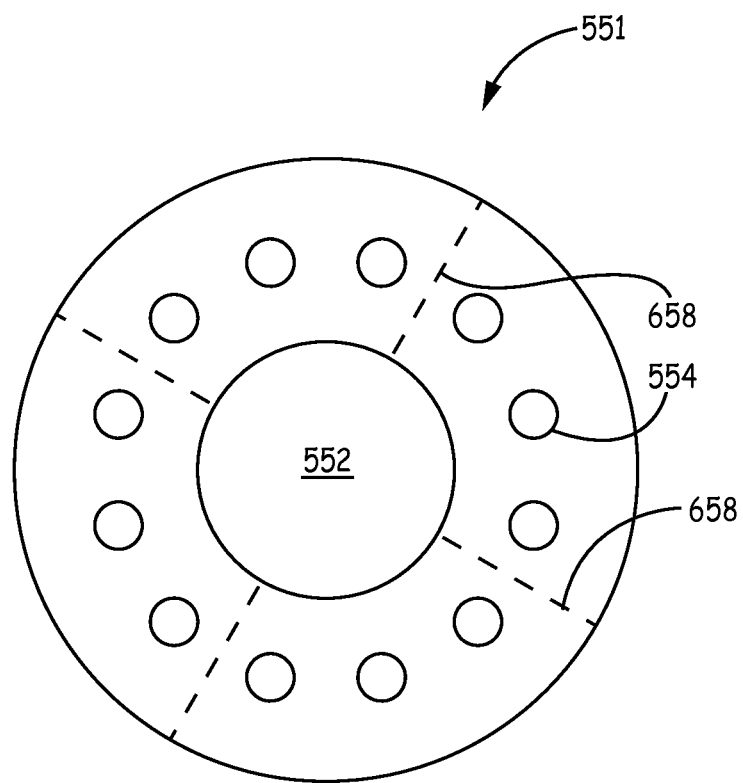
FIG. 6 is a top view of a base plate, according to an embodiment.

FIG. 6 shows a top view of one example of an alternative base plate 551 that can be used as a sacrificial base plate. Base plate 551 can define one or more break lines 658. Each break line 658 can include perforations. A break line 658 can be a portion of the base plate 551 that is weakened, such as by removing material. A break line 658 can encourage the base plate 551 to fail at a certain location or to fail with less force being applied to the base plate 551. In an embodiment the break line 658 can be laser etched. The break line 658 can be configured such that the base plate 551 can be biased to fail in a certain direction, such as away from a street or sidewalk. One or more break lines 658 can be on half of the base plate 551, such as weaken a portion of the base plate 551 and to encourage the base plate 551 to fail in a desired direction.

FIG. 7 shows a view of the post 402, the sacrificial base plate 440, the bottom base plate 438, the gap 442, the surface material 434, and anchors 436. The base plates 438 and 440 are shown in dashed lines. The bottom edge of post 402 is not shown in the FIG. 7 for clarity. The post 402 terminates at bottom edge 703. The bottom base plate 438 can be disposed closer to the surface material 434 than the sacrificial base plate 440. The bottom base plate 438 can be attached to a surface material 434 with one or more anchors 436. The bottom base plate 438 can be spaced away from the surface material 434, such as to allow room for one or more nuts 762 to be located between the surface material 434 and the bottom base plate 438. As discussed above, in an embodiment the nuts 762 can be used to level the bottom base plate 438. The sacrificial base plate 440 can be coupled to the bottom base plate 438 with one or more connectors 760. The connectors 760 can extend through gap 442. In one embodiment that is not illustrated, each connector is the portion of an anchor 436 that joins the permanent and sacrificial base plates. In an embodiment, the gap 442 between the two base plates can have a height of 0.125 inches or more. In an embodiment, the gap 442 between the two base plates can have a height of 2.0 inches or less, or 1.0 inch or less.

The connectors 760 (shown in FIG. 7) can include a portion 765 that can withstand less force than the rest of the connector, such that it breaks in a desired location. In an embodiment shown in FIG. 7, the connectors 760 have a portion 765 that can withstand less force than the rest of the connector located in the gap 442. This is further discussed in FIG. 10. In an embodiment of a connector 760, a Dent Breakaway Bolt™ connector can be used, available from Dent Breakaway Industries, Farmington, N. Mex.

The anchors 436 can include threads, such as to mate with threads on a nut 762 or on a base plate. In an embodiment, the bottom base plate 438 is sandwiched between two nuts 762 on each anchor 436, such that the two nuts 762 can hold the bottom base plate 438 in place along the anchor 436. Similarly, the sacrificial base plate 440 can be held in place with two nuts 762 along a connector 760.

In an embodiment, one nut 762 can be disposed between the bottom base plate 438 and the sacrificial base plate 440 and hold both base plates in place. In such an embodiment, the size of the nut 762 can at least partially define the size of the gap 442. In an additional embodiment, a washer 764, such as a locking washer can be disposed between a nut 762 and a base plate.

In an embodiment, the anchors 436 have a diameter of 0.125 inches or more. In an embodiment, the anchors 436 have a diameter of 0.75 inches or less. In an embodiment, the connectors 760 have a diameter of 0.125 inches or more. In an embodiment, the connectors 760 have a diameter of 0.75 inches or less. In an embodiment, the anchors 436 include aluminum. In an embodiment, the connectors 760 include aluminum.

In an embodiment, connector 445 can couple the post 402 to the sacrificial base plate 440, via a side aperture. The connector 445 can also couple the reinforcing band 444 to the post 402. The connector 445 can extend through apertures in the reinforcing band 444 and the post 402.

FIG. 8 shows an arrangement of the post 402, the sacrificial base plate 440, the bottom base plate 438, the gap 442, the surface material 434, and anchors 436. The bottom base plate 438 can be attached to a surface material 434 with one or more anchors 436. The sacrificial base plate 440 can be coupled to the bottom base plate with one or more connectors 761. The connectors 761 can extend through gap 442. In this embodiment, the connector 761 is separate from the anchor 436. There can be an unequal number of anchors 436 and connectors 761. In one embodiment there are four connectors 761.

Figure 9:
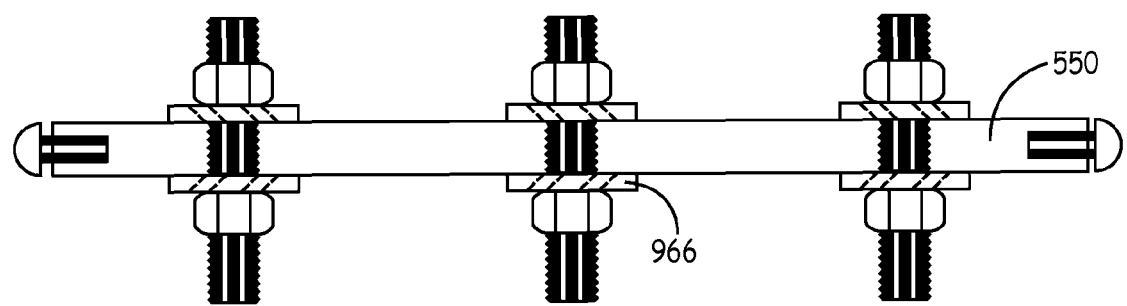
FIG. 9 is a view of a portion of an accessible pedestrian signal station, according to an embodiment.

FIG. 9 is a view of a base plate 550 held in place with two nuts along a connector or anchor. The APS station 400 can include a locking mechanism 966, such as to provide resistance against the nut from moving from its desired position. The locking mechanism 966 can be configured to engage at least a portion of one or more of a nut, an anchor, a connector, and a base plate. The locking mechanism 966 can include a locking washer. Alternatively, an anti-seize lubricant can be applied to one or more of a nut, a connector, an anchor, and a base plate, such as during installation or replacement of the sacrificial base plate.

Figure 10:
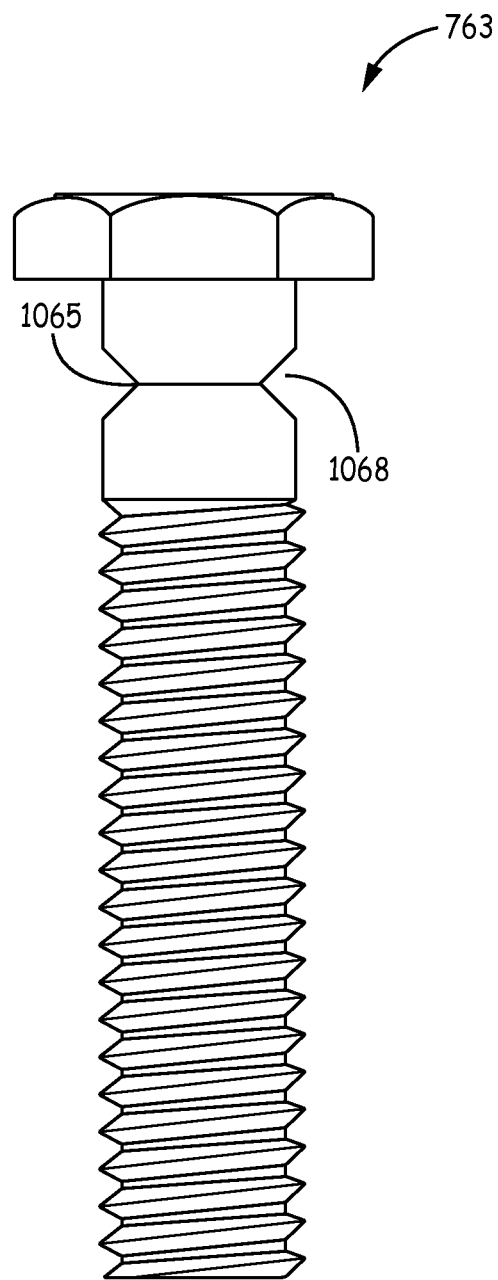
FIG. 10 is a view of a connector, according to an embodiment

FIG. 10 shows an embodiment of an anchor or connector 763 that can be used in an APS station 400 to connect the bottom base plate 438 to the sacrificial base plate 440. The shaft of the anchor or a connector 763 can define a notch 1068, such as a portion of a shaft that is inconsistent with the majority of the shaft. The notch 1068 can be where material has been removed from the shaft. The notch 1068 can make the shaft structurally fail, such as along line 1065, with less force than a shaft without a notch. The notch 1068 can be positioned between a bottom surface of the bottom base plate 438 and a top surface of the sacrificial base plate 440, so that if the connector 763 fails at the notch 1068, the sacrificial base plate 440 will be torn away from the bottom base plate 438, further reducing the chance of damage to the bottom base plate 438 or anchors 436. The shaft can include threads, such as to mate with threads of one or more of a locking mechanism, a nut, and a base plate. In an embodiment, the shaft of the connector 763 can include threads along the shaft above and below the notch 1068.

Figure 11:
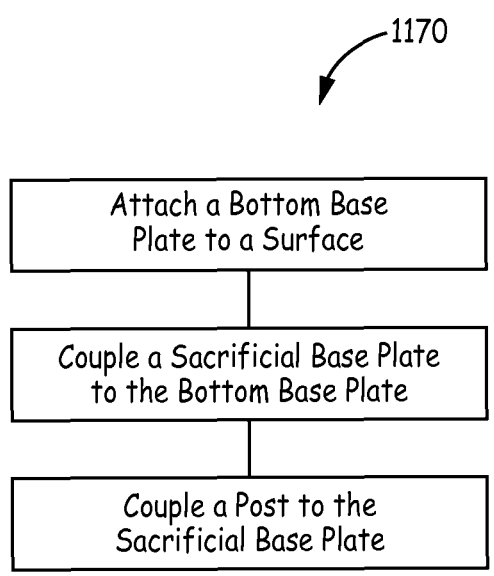
FIG. 11 is a flowchart depicting a method of installing an accessible pedestrian signal station, according to an embodiment.

FIG. 11 is a flowchart depicting a method 1170 of installing an accessible pedestrian signal station, according to an embodiment. The method 1170 can include attaching a bottom base plate to a surface material, such as the ground or a roadway surface material. The bottom base plate can be attached to the surface material with one or more anchors. The anchors can be partially disposed within the surface material. Nuts can be positioned along an anchor to rest the bottom base plate on, such as to keep the bottom base plate level or position the bottom base plate slightly off of the surface material. An additional nut can be disposed on and along the anchor to sandwich the bottom base plate between at least two nuts, so as to couple the bottom base plate to the surface material.

The method 1170 can include coupling a sacrificial base plate to the bottom base plate, such as with one or more connectors. The sacrificial base plate and the bottom base plate can define a gap between the two base plates.

The method 1170 can include coupling a post to the sacrificial base plate. In an embodiment the sacrificial base plate can be coupled to the post, prior to coupling the sacrificial base plate to the bottom base plate. An access panel can be provided on the post, such as to allow a user access to the top surface of the sacrificial base plate while coupling the sacrificial base plate to the post or to the bottom base plate. The method can include coupling a reinforcement band to the sacrificial base plate with a reinforcing band connector that extends into a reinforcement band connection aperture defined by the sacrificial base plate. The method can include rotating the sacrificial base plate relative to the bottom base plate.

Figure 12:
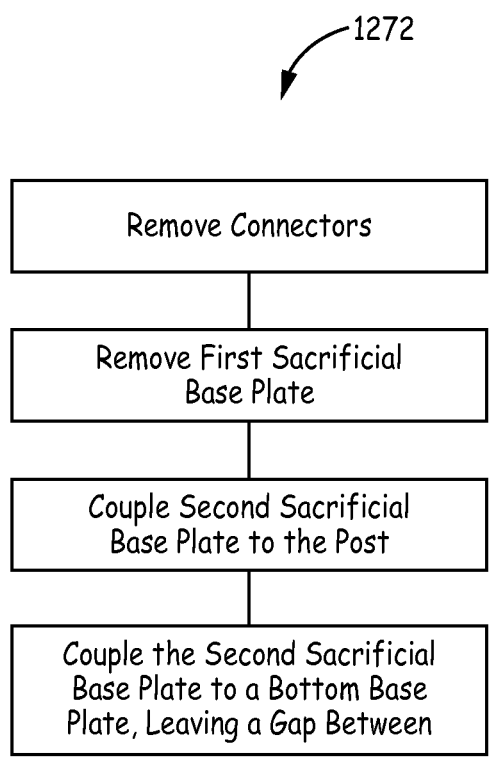
FIG. 12 is a flowchart depicting a method of replacing a portion of an accessible pedestrian signal station, according to an embodiment.

FIG. 12 is a flowchart depicting a method 1272 of replacing a portion of an accessible pedestrian signal station, according to an embodiment. At times there is a need to replace a portion of an APS station 400, such as if the APS station 400 is damaged from a car crash or vandalism. In the case of a car crash or vandalism involving the APS station 400, the sacrificial base plate can structurally fail, such that the anchors and bottom base plate remain relatively in their previous condition, in which case they can be reused. In some instances the post can be unharmed and able to be reused as well. In this case, the method 1272 can include removing the connectors in order to separate the damaged sacrificial base plate from the post. The method 1272 can include obtaining an undamaged sacrificial base plate and replacing the damaged sacrificial base plate with the undamaged sacrificial base plate.

The method 1272 can include coupling the undamaged sacrificial base plate to the post, such as with connectors. The method 1272 can include coupling the sacrificial base plate to the bottom base plate, such as with connectors. In an alternative embodiment, the method 1272 can include coupling the undamaged sacrificial base plate to the bottom base plate prior to being coupled to the post. The method 1272 can then include coupling the post can to the sacrificial base plate after the sacrificial base plate is coupled to the bottom base plate.

Figure 13:
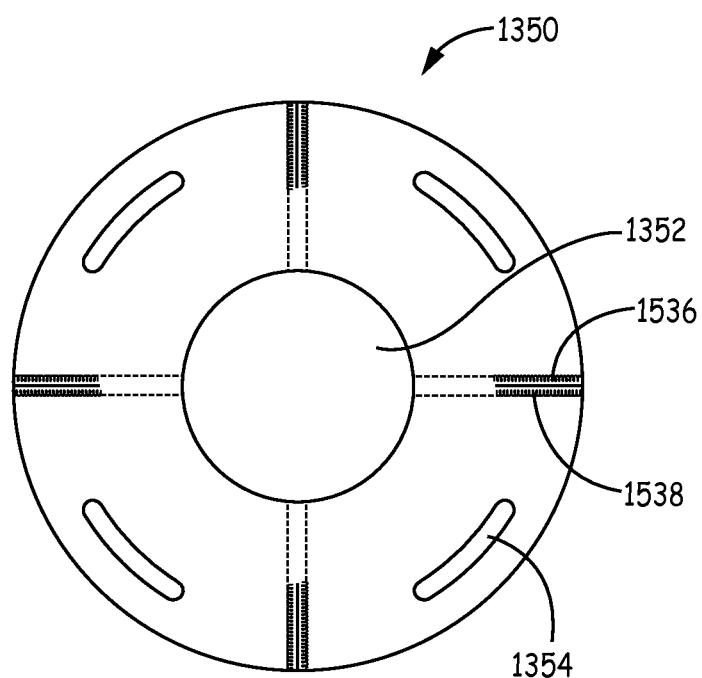
FIG. 13 is top view of a sacrificial base plate, according to an embodiment.
Figure 14:
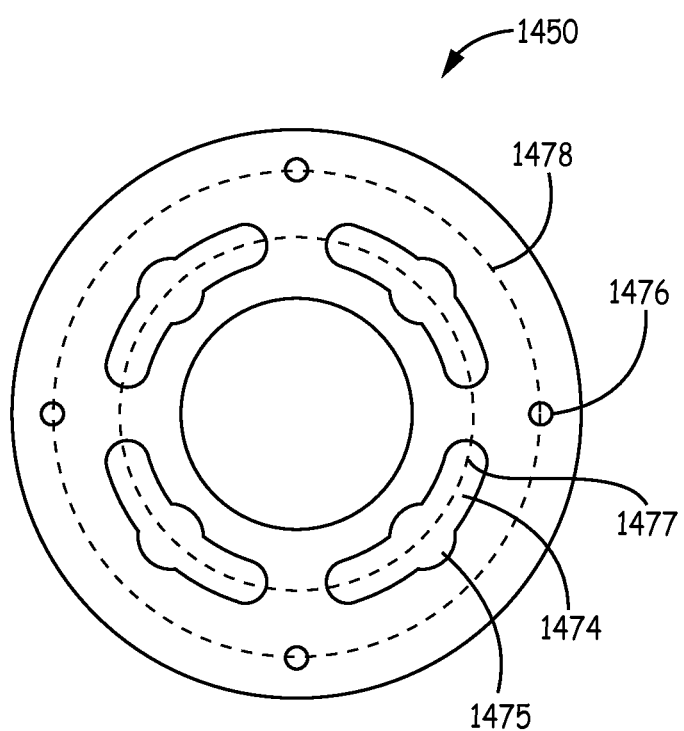
FIG. 14 is top view of a bottom base plate, according to an embodiment.

FIG. 13 and FIG. 14 show top views of a base plate 1350 and base plate 1450, respectively. In an example, the base plate 1350 shown in FIG. 13 can be representative of a sacrificial base plate and the base plate 1450 shown in FIG. 14 can be representative of a bottom base plate used together in an APS station.

The base plate 1350 can define an aperture 1352, such as to accommodate wire connections there through, similar to the aperture 552 described above in reference to FIG. 5A. The base plate 1350 can define two or more connection apertures 1354, such as to accommodate connectors there through, similar to the connection apertures 554 described above in reference to FIG. 5A. In an embodiment, the connection aperture 1354 can define a slot, such that a connector can extend through the connection aperture 1354 and the base plate 1350 can be at least partially rotated while the connector is stationary. In an embodiment, the connection aperture 1354 can be a curved elongate opening or slot, such as to follow along a portion of a circle that is concentric to the outside edge of the base plate 1350. The term "elongate" is intended to mean longer than two times its width, in this context. The ability to partially rotate the top plate with respect to the bottom plate will simplify the installation process as it will make it easier to connect the top plate to the connectors on the bottom plate. The ability to partially rotate the top plate with respect to the bottom plate will also simplify the process of putting the APS station in the desired orientation, such as facing the path of most pedestrians. In an embodiment, two or more connectors can at least partially extend through a single connection aperture 1354, though the more frequent example will have just one anchor extending through a single anchor aperture 1354.

Base plate 1350 defines side apertures 1356, similar to side apertures 556 shown in FIG. 5B. The side apertures 1356 provide a location for a bolt or other connector to couple the post 402 and the band 444 to the base plate 1350. In one example, the base plate 1350 defines four side apertures 1356, equally spaced around the perimeter of the base plate 1350. In one example, the side apertures extend all the way through the base plate 1350 to the aperture 1352. In one example, the side apertures 1356 define threads over only a threaded portion 1358 of a length of each side aperture 1356.

Now referring to FIG. 14, the base plate 1450 can define an anchor aperture 1452, such as to accommodate wire connections there through, similar to the aperture 552 described above in reference to FIG. 5A.

The base plate 1450 can define one or more anchor apertures 1474. The anchor apertures can define a slot, such that an anchor can extend through the anchor aperture 1474 and the base plate 1450 can be at least partially rotated. The anchor apertures 1474 can be a curved elongate opening or slot, such as to follow along a portion of a circle that is concentric with the outside edge of the base plate 1450. In an embodiment, there can be four anchor apertures 1474 spaced equally apart, such as 90 degrees apart from each other. If there are four anchors that are not equally spaced apart, the slot shaped anchor apertures 1474 can allow the anchor apertures 1474 to sill accommodate the anchors with inconsistencies in the spacing. The ability to partially rotate the base plate 1450 with respect to the anchors during the installation process, which is provided by the curved elongate slot configuration of the anchor apertures, will simplify the installation process as it will make it easier to connect the base plate to the anchors. In an embodiment, two or more anchors can extend through a single anchor aperture 1474, though the more frequent example will have just one anchor extending through a single anchor aperture 1474. The anchor apertures 1474 can include an expanded portion 1475, such as to allow the head of a bolt, or any other inconsistently sized connector, to at least partially pass through the anchor aperture 1474.

The base plate 1450 can define two or more connection apertures 1476, such as to accommodate connectors there through. In an embodiment, the connection aperture 1476 can be located closer to the outer edge of the base plate 1450 than the anchor apertures 1474. The connection apertures 1476 can be circular. In an embodiment, there can be an equal number of connection apertures 1476 as there are anchor apertures 1474. In an embodiment, there can be more anchor apertures 1474 than connection apertures 1476. In an embodiment, there can be more connection apertures 1476 than anchor apertures 1474. The anchor apertures 1474 can be located along a circle, such as the circle depicted by reference line 1477. The connection apertures 1476 can be located along a circle, such as the circle depicted by reference line 1478. The circle depicted by reference line 1477 can be smaller than the circle depicted by reference line 1478. In an embodiment with the base plate 1450 as a bottom base plate and base plate 1350 as a sacrificial base plate, the connection apertures 1476 can be disposed in a circle with the same diameter as the connection apertures 1354.

In an embodiment, an accessible pedestrian signal station can include a bottom base plate similar to the base plate 1450 shown in FIG. 14, and a sacrificial base plate similar to the base plate 1350 shown in FIG. 13. The bottom base plate can be attached to a surface material. The bottom base plate can be rotated in order for the anchors to match up with the anchor apertures 1474. The anchor apertures 1474 can be slot shaped, such as to accommodate for inconsistencies in the location or spacing of the anchors. The sacrificial base plate can be coupled to the bottom base plate. The slot shaped connection apertures in the sacrificial base plate can allow for any inconsistencies in the spacing or positioning of connectors with the sacrificial base plate and the bottom base plate. A gap can be defined between the bottom base plate and the sacrificial base plate.

A post can be coupled to the sacrificial base plate. In an embodiment, the post can be coupled to the sacrificial base plate, prior to the sacrificial base plate being coupled to the bottom base plate. An access panel can be provided on the post, such as to allow a user access to the top surface of the sacrificial base plate while coupling the sacrificial base plate to the post or to the bottom base plate.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. It should be understood that many variations and modifications may be made while remaining within the spirit and scope of the invention.

The invention claimed is:

1. An accessible pedestrian signal system to assist persons crossing a signal-controlled intersection, comprising:
    a post configured to support a pedestrian interface and pedestrian activation device, the post having a bottom end and a top end;
    a bottom base plate configured for long-term operative attachment to a surface material, the bottom base plate defining an aperture to accommodate wire connections there through;
    a sacrificial base plate configured for attaching to the bottom base plate and to the bottom end of the post, the sacrificial base plate comprising a top surface, a bottom surface, and a side surface, the sacrificial base plate defining an aperture to accommodate wire connections there through, the sacrificial base plate separated from the bottom base plate by a gap;

a plurality of connectors passing through the gap between the bottom base plate and the sacrificial base plate and connecting the bottom base plate to the sacrificial base plate; and a reinforcing band surrounding at least a portion of the sacrificial base plate;

wherein the sacrificial base plate defines a reinforcement band connection aperture extending inward from the side surface;

wherein the reinforcing band is coupled to the sacrificial base plate with a reinforcing band connector, the reinforcing band connector extending at least partially into the reinforcement band connection aperture;

wherein the sacrificial base plate is configured to structurally fail more readily than the bottom base plate in response to a force being applied to the post.

2. The system of claim 1, wherein the gap between the two plates is at least 0.125 inches and not more than 1.75 inch.

3. The system of claim 1, wherein the bottom base plate is at least 0.25 inches thick and no more than 1.5 inches thick and the sacrificial base plate is at least 0.1 inches and no more than 0.75 inches thick.

4. The system of claim 1, wherein the bottom base plate comprises the same material as the sacrificial base plate and the bottom base plate is thicker than the sacrificial base plate.

5. The system of claim 1, wherein the surface material comprises one or more of the following materials: concrete, asphalt, and cement and wherein the bottom base plate is configured for attaching to the surface material using two or more anchor bolts.

6. The system of claim 1, wherein the sacrificial base plate is configured to be coupled to the bottom base plate with one or more connectors.

7. The system of claim 6, wherein the sacrificial base plate defines curved, elongate openings for receiving the connectors, wherein the bottom base plate defines curved elongate openings for receiving the connectors.

8. The system of claim 6, further comprising a locking mechanism configured to engage a portion of one or more of the connectors.

9. The system of claim 7, wherein the locking mechanism comprises a locking washer.

10. The system of claim 6, wherein one or more of the connectors defines a notch.

11. The system of claim 1, wherein the sacrificial base plate is configured to attach to the bottom end of the post using connectors.

12. The system of claim 1, wherein the bottom base plate and the sacrificial base plate are substantially circular and have substantially similar diameters, wherein the diameters are at least 5 inches and not more than 12 inches.

13. The system of claim 1, wherein the post comprises a speaker configured for audio communication with pedestrians.

14. The system of claim 1, wherein the post comprises a rounded dome at the top end.

15. The system of claim 1, wherein the pedestrian activation device is configured to send a signal to a traffic control system indicating that a pedestrian is waiting to cross a street.

16. The system of claim 1, wherein the sacrificial base plate comprises perforations.

17. The system of claim 1, wherein the sacrificial base plate comprises a break line.

18. A method of replacing an accessible pedestrian signal system to assist persons crossing a signal-controlled intersection, comprising:

removing a plurality of connectors that couple a first sacrificial base plate to a post;

removing the first sacrificial base plate;

coupling a second sacrificial base plate to the post with a plurality of connectors; and coupling the second sacrificial base plate to a bottom base plate with one or more bolts and leaving a gap between the second sacrificial base plate and the bottom base plate;

coupling a reinforcement band to the second sacrificial base plate with a reinforcing band connector that extends into a reinforcement band connection aperture defined by the second sacrificial base plate, wherein the reinforcement band connection aperture extends inwards from a side surface of the second sacrificial base plate;

wherein the first sacrificial base plate is substantially similar to the second sacrificial base plate;

wherein the first and second sacrificial base plates are designed to structurally fail more readily than the bottom base plate in response to a force being applied to the post.

19. An accessible pedestrian signal system designed to be coupled to a bottom base plate comprising:

a post configured to support a pedestrian interface and pedestrian activation device, the post having a bottom end and a top end;

a sacrificial base plate configured to be coupled to the bottom end of the post with one or more connectors, the sacrificial base plate defining a conduit aperture to accommodate wire connections there through, and a plurality of connector apertures configured to accommodate a connector passing there through, wherein the sacrificial base plate is designed to structurally fail more readily than the bottom base plate in response to a force being applied to the post; and a reinforcing band surrounding at least a portion of the sacrificial base plate, wherein the reinforcing band is coupled to the sacrificial base plate with a reinforcing band connector that extends into a reinforcement band connection aperture defined by the sacrificial base plate, wherein the reinforcement band connection aperture extends inwards from a side surface of the second sacrificial base plate.

* * * * *